United States Patent [19]

Gaigl

[11] Patent Number: 4,726,753

[45] Date of Patent: Feb. 23, 1988

[54] APPARATUS FOR PRODUCING MOULDED ARTICLES

[75] Inventor: Karl-J. Gaigl, Stockach, Fed. Rep. of Germany

[73] Assignee: Fahr-Bucher GmbH, Gottmadingen, Fed. Rep. of Germany

[21] Appl. No.: 897,621

[22] Filed: Aug. 18, 1986

[30] Foreign Application Priority Data

Aug. 20, 1985 [DE] Fed. Rep. of Germany ....... 3529775

[51] Int. Cl.[4] ............................................. B29C 45/68
[52] U.S. Cl. ..................................... 425/186; 100/194; 264/39; 425/190; 425/225; 425/234; 425/454; 425/575; 425/589; 425/DIG. 116
[58] Field of Search ............... 425/150, 186, 190, 234, 425/450.1, 572, 575, 589, DIG. 116, DIG. 221, 233, 225, 454, 556; 100/193, 194, 199, 206; 264/39, 542

[56] References Cited

U.S. PATENT DOCUMENTS 2,975,473  3/1961  Hagen et al. ...................... 264/542
3,734,671  5/1973  Talasz ............................... 425/450.1
4,408,981  10/1983  Brown ................................ 425/589

Primary Examiner—Jay H. Woo
Assistant Examiner—Timothy W. Heitbrink
Attorney, Agent, or Firm—Bachman & LaPointe

[57] ABSTRACT

In an apparatus for producing moulded articles, particularly of plastic, by means of a mould formed from individual mould parts (3, 4, 5) optionally fixed to mounting surfaces, support parts, etc and which, following a closed position, move during the moulding process into an open position by a stroke c in a direction x a working device, e.g. a demoulding, charging, cleaning and/or similar device is introduced into the gap (6, 7) formed between the faces of the mould parts. With at least two mould parts (3, 4 and/or 5) is associated in each case a slide (I, II and/or III) movable by a stroke d in a y-direction for introducing the working devices. As a function of the movement of at least one mould part (3, 4 and/or 5), or its mounting surface (1, 2), support part (18, 19), etc, the slide (I, II and/or III) perform the stroke d in the y-direction.

11 Claims, 2 Drawing Figures

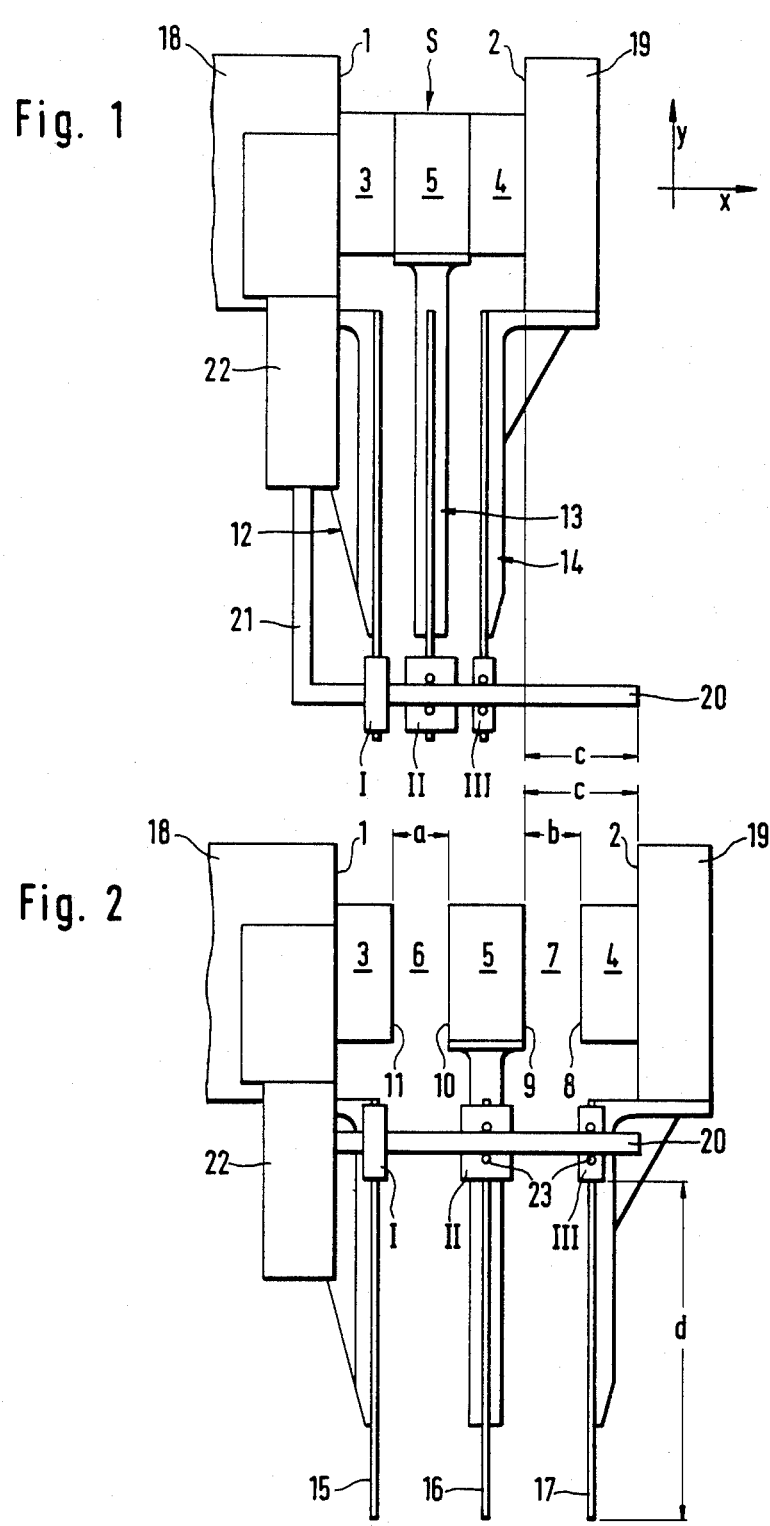

APPARATUS FOR PRODUCING MOULDED ARTICLES

The invention relates to an apparatus for producing moulded articles, more particularly of plastic, by means of a mould formed from individual mould parts optionally fixed to mounting surfaces, support parts and the like and which, during the moulding process, move from a closed position into an open position by a stroke in a direction x, so that between the faces of the mould parts a gap is formed, into which is introduced a working device, e.g. a demoulding, charging, cleaning and/or similar device.

In connection with such apparatuses, e.g. in injection moulding machines, presses, etc, every effort is now made to achieve a high degree of automation, in order to increase the number of items produced per machine. This means that the time during which the mould parts of a machine are opened and the injection moulded articles are removed or additional parts introduced into the mould must be kept as short as possible. This problem obviously does not occur in the case of moulded articles, which drop out of the mould following injection moulding and the opening of the mould. However, the present invention deals with moulded articles which, e.g. in order to avoid damage or permit a correct placing in magazines, remain in the mould and have to be removed by a demoulding device. The same applies regarding charging processes. In certain cases it may also be necessary to carry out cleaning work on the mould following its opening. All these and similar operations must in the present case be performed by working devices.

Hitherto such work has either been carried out manually or with very complicated means. For example, it is known that such a working device comprises two arms coupled to a slide or carriage and which, following the opening of the mould, are introduced into the gap between the mould parts. To ensure separation of the two arms corresponding to the moving apart of the mould parts, it is necessary to have an additional movement in the opposite direction of the movable plate, along which one arm runs. Difficulties occur particularly in the case of multilevel or multistage moulds, in which more than one face must be acted on and problems particularly occur on exceeding or passing below the opening stroke performed by the two moulds parts. This also leads to a change in the position of the take-off device with respect to the mould and considerable problems occur in the production sequence.

The object of the invention is to provide an apparatus of the aforementioned type, in which these problems are eliminated, in which it is possible to act upon a random number of mould parts or the faces thereof and in which there are no disadvantageous consequences of exceeding or passing below a given desired stroke.

According to the invention this object is achieved in that with at least two mould parts is in each case associated a slide movable by a stroke in a y-direction for introducing the working devices and the slides driven as a function of the movement of at least one mould part or its mounting surface, support parts or the like perform the stroke in the y-direction.

The slides are located on slide guides associated with the corresponding mould parts. For reasons of simplicity, these slide guides comprise rails fixed to the mould parts or their support parts, mounting surfaces, etc, but no limits are placed here on the routine activity of the expert. The slides are preferably joined by means of at least one side coupling for the purpose of their synchronous movement and on which they also move in the x-direction following the movements of the mould part thereof. This naturally does not apply to a slide which is associated with a fixed mould part.

As a result of this arrangement, the slide movements in the x-direction are solely determined by the opening stroke of the mould parts, so that the slide also exceeds or drops below a particular desired stroke. No decisive importance is attached to the number of mould parts provided, in what reciprocal relationship these mould parts are opened or whether one mould part is fixed and the other movable.

In addition, no significance is attached to the appearance of the slide coupling. According to a preferred, simple embodiment, it is a guide rod, which is fixed to one slide and runs in the x-direction, whilst the two other slides comprise the guide rod with a bearing. However, as a function of the individual case, all other possible variants can be considered.

The invention can be particularly effectively described with respect to a multilevel or multistage mould, which comprises two mould parts connected with mounting surfaces and at least one further mould part. However, the invention can be equally effectively realised on a mould with only the two previously described mould parts.

In the case of the multistage mould, in its open position between the individual mould parts gaps are formed, which have specific widths and which are preferably identical. However, the width of the gaps is dependent on the relationship with which the individual mould parts move apart. At least one slide should be associated with each mould part and optionally the slide for the central part of the multistage mould has two corresponding working devices for operating the two faces or comprises two synchronized slides.

If one slide is associated with the mould on a fixed mounting surface, then said slide only moves in the y-direction by the desired slide stroke. However, together with the mould parts, the other slides perform a movement in the x-direction and simultaneously follow the movement in the y-direction.

In order that the working means follows both a passing above and a passing below a desired stroke for the mould parts at the end of the stroke, i.e. close to the latter without completing a further movement in the y-direction, the stroke, at least at the end thereof, should be completed in a clearly defined end position. The working means then exactly follow the movement of the mould parts, without any engaging over or under the demoulding or charging members. There is preferably also a clearly defined end position at the start of the stroke.

Within the scope of the automation the slide is moved by a drive. No fundamental inventive significance is attached to the way in which the drive is connected to the slide. A suitable drive is shown in U.S. Patent Application Ser. No. 789,081, by Karl-Josef Gaigl for GEAR, filed Oct. 18, 1985, the disclosure of which is incorporated herein by reference. However, the drive should be synchronous with a drive for opening the mould, i.e. at the instant when the moulds open the slides should be moved together with the working means into the gaps. Conversely at the instant when the mould starts to close the working means must be drawn out of the gaps via the slides. This can take place with all possible aids, e.g. those of a hydraulically or electronically controlled type.

Further advantages, features and details of the invention can be gathered from the following description of a preferred embodiment and the drawings, wherein show:

FIG. 1, a diagrammatically represented plan view of a machine part of an inventive apparatus in the closed position.

FIG. 2, a diagrammatically represented plan view of the machine parts according to FIG. 1 with the apparatus in the open position.

With respect to the apparatus for producing moulded articles, FIG. 1 shows a mould mounting surface 1 on a fixed machine block 18 and a mould mounting surface 2 on a movable machine element 19, the latter performing a stroke by an amount c in direction x. Machine element 19 and machine block 18 are conventionally interconnected by means of not shown columns and a closing mechanism.

One part 3, 4 of a multistage or multilevel mould S is fixed to each of the two mould mounting surfaces 1, 2. A central mould part 5 is also moved in direction x on opening the multistage mould S (FIG. 2), but in the embodiment according to FIG. 2 only by roughly half the distance which must be covered by mould part 4 on the movable mounting surface 2. Thus, between the individual mould parts 3 and 5, as well as 4 and 5 gaps 6, 7 are formed of in each case a width a or b. The drive for the movable mounting surface 2 and also that for the central part 5 of the multistage mould S are not shown for reasons of clarity.

Demoulding, charging, cleaning and similar working processes particularly on faces 8–11 of mould parts 3, 4, 5 can be performed in the gaps 6, 7 of said parts formed when the machine is in open position. For this purpose corresponding working devices must be introduced into the gaps 6, 7, but are not shown in the present drawing, but can be fixed to slides I, II and III.

Each slide I, II and III is located on a corresponding slide guide 12, 13, 14 with which, in a preferred embodiment, is in each case associated a rail 15, 16, 17, on which slides I, II and III slide. Slide guide 12 is flanged onto machine block 18 with the fixed mounting surface 1 and slide guide 14 on machine element 19 with the movable mounting surface 2. Slide guide 13 is associated with the central mould part 5. All three slides I, II, III are interconnected by means of a slide coupling 20 which is fixed to slide I, whilst slides II and III can move in direction x along it. This mobility is merely indicated by the bearing pins 23.

Slide I is so connected via a rod 21 to a drive 22, that it can perform a stroke in the y-direction at right angles to the x-direction. As a result of the slide coupling 20, slide I takes the other slides II and III with it during its stroke d in the y-direction, whilst drive 22 is controlled in such a way that it only moves slide I if the apparatus opens, i.e. the machine element 19 moves in the x-direction. Thus, the slides II and III are also driven in the x-direction and perform movements both in the x and in the y-direction.

If for any reason the movable mounting surface 2 extends beyond stroke c or does not perform the complete stroke c, this does not have a negative effect for the function of the working devices on faces 8–11, because drive 22 is controlled in such a way that it has a fixed end position.

I claim:

1. Apparatus for producing moulded articles, said apparatus comprising a mould formed from individual mould parts, each said mould part fixed to a support, at least one mould part being movable during the moulding process by a first stroke in a first direction into a mould open position wherein at least one gap is formed between the faces of the mould parts, and means for introducing at least one working device into said at least one gap characterized in that at least two of said mould parts have a slide associated therewith for introducing the at least one working device, each said slide being movable in a second direction perpendicular to said first direction by a second stroke performed in said second direction as the result of the movement of at least one of said mould part supports and said mould parts.

2. Apparatus according to claim 1 characterized in that each slide runs on a slide guide and each said slide guide is fixed to at least one of said mould parts and said supports.

3. Apparatus according to claim 1 characterized in that the slides run synchronously.

4. Apparatus according to claim 3 characterized in that the slides are interconnected by means of at least one slide coupling and are movable relative to one another in the first direction.

5. Apparatus according to claim 4 characterized in that the slide coupling comprises a guide rod running in the first direction.

6. Apparatus according to claim 5 characterized in that the guide rod is fixed to one of said slides whilst each other slide comprises the guide rod with a bearing.

7. Apparatus according to claim 1 characterized in that a drive is connected to one of said slides for performing the second stroke.

8. Apparatus according to claim 7 characterized in that the drive runs synchronously with a drive for opening the mould.

9. Apparatus according to claim 1 characterized in that the second stroke passes into a clearly defined end position at the end of the stroke when the at least one working device has been introduced into the at least one gap.

10. Apparatus according to claim 9 characterized in that the second stroke passes into a second clearly defined end position at the start of the second stroke.

11. Apparatus according to claim 1 characterized in that at least two of said mould parts are each supported on a mounting surface.

* * * * *